(12) United States Patent
Kubo

(10) Patent No.: US 9,429,827 B2
(45) Date of Patent: Aug. 30, 2016

(54) IMAGE PROJECTION APPARATUS, CONTROL METHOD, AND COMPUTER-READABLE STORAGE MEDIUM

(71) Applicant: Yoshio Kubo, Tokyo (JP)

(72) Inventor: Yoshio Kubo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 87 days.

(21) Appl. No.: 14/314,086

(22) Filed: Jun. 25, 2014

(65) Prior Publication Data

US 2015/0029469 A1 Jan. 29, 2015

(30) Foreign Application Priority Data

Jul. 23, 2013 (JP) ................................. 2013-153004

(51) Int. Cl.
*G03B 21/16* (2006.01)
*G03B 21/20* (2006.01)
*H01J 61/52* (2006.01)

(52) U.S. Cl.
CPC ............. *G03B 21/16* (2013.01); *G03B 21/206* (2013.01); *G03B 21/2026* (2013.01); *H01J 61/52* (2013.01)

(58) Field of Classification Search
CPC G03B 21/16; G03B 21/2026; G03B 21/206; H01J 61/52
See application file for complete search history.

(56) References Cited

U.S. PATENT DOCUMENTS

| 2002/0135324 A1* | 9/2002 | Fujii | H05B 41/2928 315/291 |
| 2003/0011320 A1 | 1/2003 | Okamoto et al. | |
| 2009/0224675 A1 | 9/2009 | Pekarski et al. | |
| 2009/0296400 A1 | 12/2009 | Ikeda et al. | |
| 2010/0157257 A1 | 6/2010 | Nishizawa et al. | |
| 2012/0074858 A1* | 3/2012 | Ono | H05B 41/2883 315/209 R |
| 2014/0104584 A1 | 4/2014 | Kado et al. | |

FOREIGN PATENT DOCUMENTS

| EP | 1416518 | 5/2004 |
| EP | 2197250 | 6/2010 |
| JP | 2003-017280 | 1/2003 |
| JP | 2007-059281 | 3/2007 |

(Continued)

OTHER PUBLICATIONS

European Extended Search Report dated Mar. 3, 2015 for corresponding EP Application No. 14175232.

*Primary Examiner* — Sultan Chowdhury
*Assistant Examiner* — Magda Cruz
(74) *Attorney, Agent, or Firm* — Harness, Dickey & Pierce, P.L.C.

(57) ABSTRACT

An image projection apparatus includes a light source in which a light emitting material emits light through an electric discharge between electrodes; an image forming unit that modulates an intensity of the light emitted from the light source to form an image; a cooling fan that cools the light source; an input unit that receives an input of an instruction signal for turning off a power source of the image projection apparatus; a voltage detector that detects a voltage value of the light source in lighting; a voltage value determining unit that determines whether the voltage value detected by the voltage detector is less than a preset threshold value when the input unit receives the instruction signal; and a cooling fan controller that performs an after-cooling operation of driving the cooling fan to cool the light source when the voltage value is less than the threshold value.

12 Claims, 6 Drawing Sheets

(56) References Cited

FOREIGN PATENT DOCUMENTS

| | | |
|---|---|---|
| JP | 4070420 | 1/2008 |
| JP | 2014-081547 | 5/2014 |
| WO | WO-2005/104183 | 11/2005 |
| WO | WO-2006/064963 | 6/2006 |

* cited by examiner

IMAGE PROJECTION APPARATUS, CONTROL METHOD, AND COMPUTER-READABLE STORAGE MEDIUM

CROSS-REFERENCE TO RELATED APPLICATION

The present application claims priority to and incorporates by reference the entire contents of Japanese Patent Application No. 2013-153004 filed in Japan on Jul. 23, 2013.

BACKGROUND OF THE INVENTION

1. Field of the Invention

The present invention relates to an image projection apparatus that projects an image, a control method of the image projection apparatus, and a computer-readable storage medium.

2. Description of the Related Art

Conventionally, in a high pressure mercury lamp widely used as a light source of a projector, an arc discharge between a pair of electrodes provided in an arc tube is utilized to cause mercury vapor (light emitting material) included in an inside of the arc tube to emit light. While mercury vapor returns to liquid when a power source of the projector is turned off, there is a case where liquid mercury adheres to the pair of electrodes on this return occasion and thereby a short circuit (shunt) is caused between the electrodes. This symptom is called "mercury bridge" and leads to a failure in lighting the lamp of the projector.

The mercury bridge is caused depending on two characteristics that liquid mercury tends to adhere to a portion at a low temperature, and that the electrode portion tends to change in temperature compared to a tube portion (light emitting tube) and the temperature at the electrode portion tends to become lower than that at the tube portion after the power source of the projector is turned off. Especially due to a correlation between the electrode temperature and a lamp power (power to be supplied to the electrodes), a difference in temperature between the electrode portion and the tube portion becomes large when the power source of the projector is turned off from a state where the lamp power is low, thereby dramatically increasing the probability of the occurrence of the mercury bridge.

Then, already known has been a technique of performing an after-cooling operation in which the lamp is kept cooled for a certain period of time after the power source of the projector is turned off to make the difference in temperature between the electrodes and the tube portion small and the probability of the occurrence of the mercury bridge low. For example, Japanese Patent No. 4070420 discloses a technique of turning off the power source after keeping the lamp power low for a certain period of time in turning off the power source of the projector to prevent the mercury bridge.

However, since the mercury bridge is prevented by reducing the lamp power, then lowering the temperature at the tube portion to be equal to or less than the boiling point of the mercury, and liquefying the mercury in the tube portion after the operation of turning off the power source in Japanese Patent No. 4070420, there is a problem of taking a long time until the lamp is turned off after the power source is turned off.

Therefore, there is a need for an image projection apparatus capable of shortening a time required until the lamp is turned off and preventing mercury bridge; and a control method and a computer-readable storage medium of the same.

SUMMARY OF THE INVENTION

It is an object of the present invention to at least partially solve the problem in the conventional technology.

According to an embodiment, there is provided an image projection apparatus that includes a light source in which a light emitting material emits light through an electric discharge between electrodes; an image forming unit that modulates an intensity of the light emitted from the light source to form an image; a cooling fan that cools the light source; an input unit that receives an input of an instruction signal for turning off a power source of the image projection apparatus; a voltage detector that detects a voltage value of the light source in lighting; a voltage value determining unit that determines whether the voltage value detected by the voltage detector is less than a preset threshold value when the input unit receives the instruction signal; and a cooling fan controller that performs an after-cooling operation of driving the cooling fan to cool the light source when the voltage value determining unit determines that the voltage value is less than the threshold value.

According to another embodiment, there is provided a control method performed in an image projection apparatus that includes a light source in which a light emitting material emits light through an electric discharge between electrodes; an image forming unit that modulates an intensity of the light emitted from the light source to form an image; and a cooling fan that cools the light source. The control method includes receiving an input of an instruction signal for turning off a power source of the image projection apparatus; detecting a voltage value of the light source in lighting; determining whether the detected voltage value is less than a preset threshold value when the instruction signal is received; and performing an after-cooling operation of driving the cooling fan to cool the light source when it is determined that the voltage value is less than the threshold value.

According to still another embodiment, there is provided a non-transitory computer-readable storage medium with an executable program stored thereon and executed by a computer of an image projection apparatus that includes a light source in which a light emitting material emits light through an electric discharge between electrodes, an image forming unit that modulates an intensity of the light emitted from the light source to form an image, and a cooling fan that cools the light source. The program instructs the computer to perform: receiving an input of an instruction signal for turning off a power source of the image projection apparatus; detecting a voltage value of the light source in lighting; determining whether the detected voltage value is less than a preset threshold value when the instruction signal is received; and performing an after-cooling operation of driving the cooling fan to cool the light source when it is determined that the voltage value is less than the threshold value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an image projection apparatus, and a control method and a program of the same according to the present invention will be explained in detail below with reference to the accompanying drawings.

Figure 1:
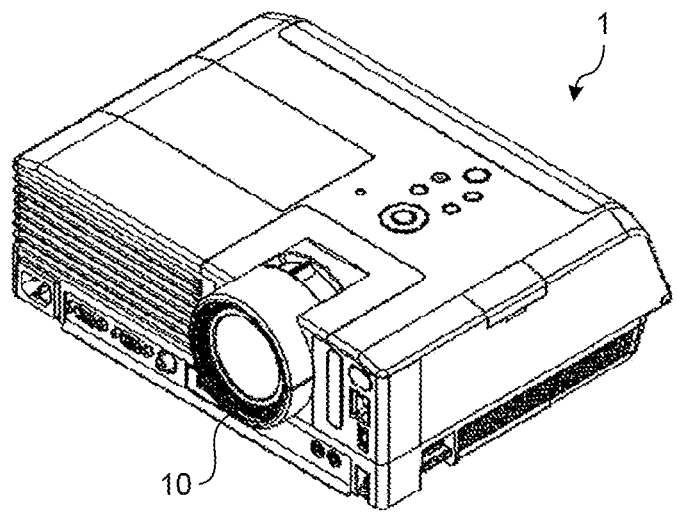
FIG. 1 is a perspective view of a projector according to an embodiment.
Figure 2:
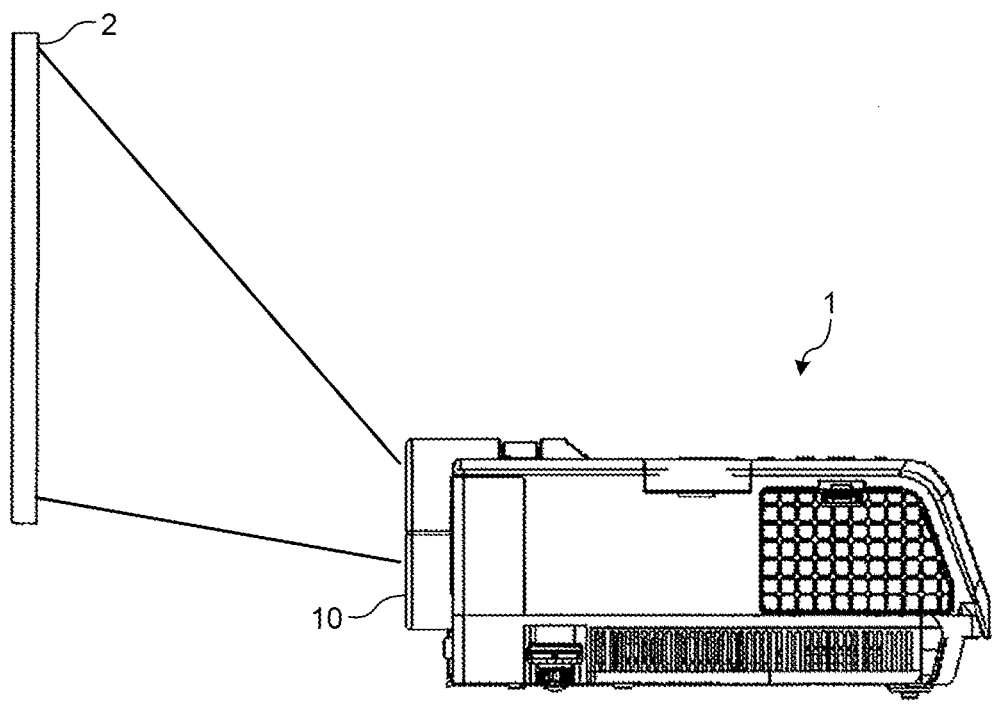
FIG. 2 is a side view of the projector according to the embodiment.

FIG. 1 is a perspective view of a projector 1 as an image projection apparatus according to an embodiment. FIG. 2 is a side view of the projector 1. Here, FIG. 2 illustrates a state where a projection light is radiated, from a projection lens 10 of the projector 1, on a screen 2 as a surface that receives the projection.

Figure 3:
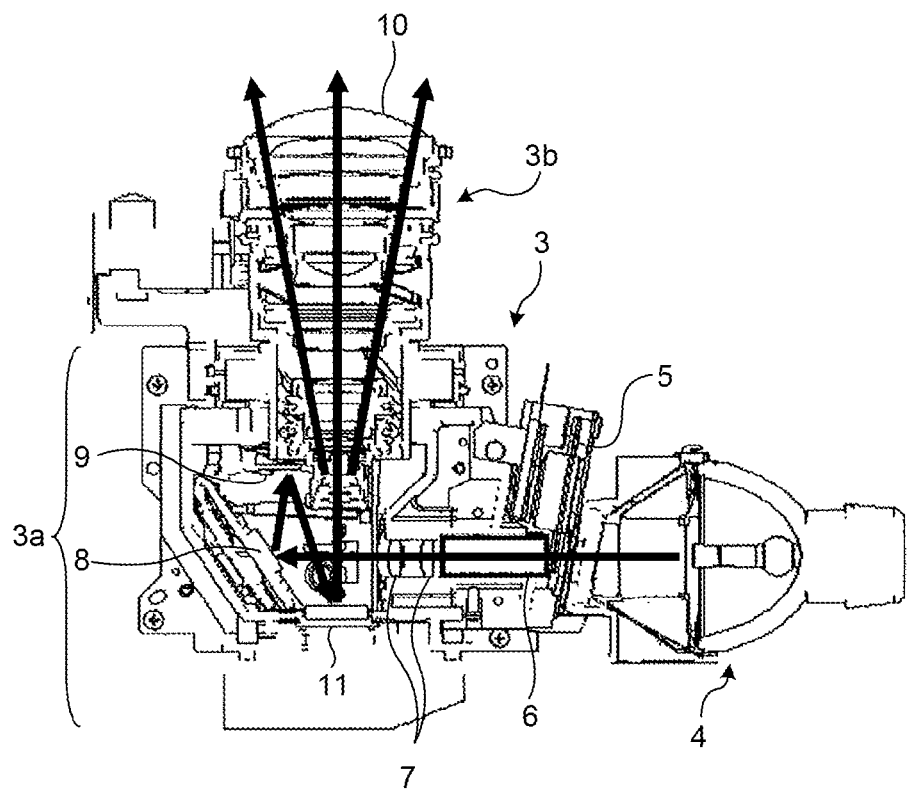
FIG. 3 is an internal cross sectional view of an optical device and a light source device provided in the projector according to the embodiment.
Figure 4:
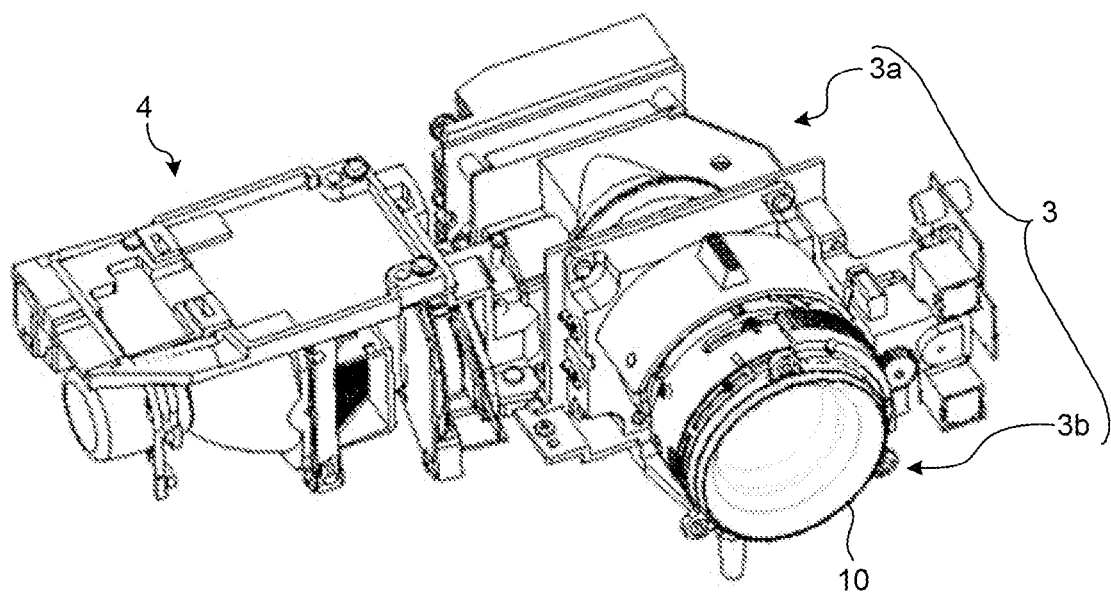
FIG. 4 is a perspective view of the optical device and the light source device provided in the projector according to the embodiment.

FIG. 3 is an internal cross sectional view of an optical device 3 and a light source device 4 provided in the projector 1. FIG. 4 is a perspective view of the optical device 3 and the light source device 4 provided in the projector 1.

The optical device 3 illustrated in FIGS. 3 and 4 is provided with an illumination mechanism 3a and a projection mechanism 3b. The optical device 3 is further provided with a color wheel 5, a light tunnel 6, a relay lens 7, a planar mirror 8, a concave surface mirror 9, and an image forming unit 11.

The color wheel 5 is disk-shaped, converts a white color light from the light source device 4 into a repetitive light of each of RGB colors per unit time, and radiates the converted light towards the light tunnel 6.

The light tunnel 6 is formed in a tubular shape by putting plate glass together and guides the light radiated from the color wheel 5 to the relay lens 7.

The relay lens 7 is formed by combining at least two lenses and condenses the light radiated from the light tunnel 6 while correcting axial chromatic aberration thereof.

The planar mirror 8 and the concave surface mirror 9 reflect, guide to the image forming unit 11, and condense the light radiated from the relay lens 7.

The image forming unit 11 is configured by using a DMD element that: has a rectangular mirror surface formed by a plurality of micromirrors; and processes and reflects the projection light to form predetermined image data by driving the micromirrors in time division separately based on data of picture and image.

The light source device 4 is provided with a high pressure mercury lamp to be explained later as a light source. The light source device 4 radiates white color light towards the illumination mechanism 3a of the optical device 3. In the illumination mechanism 3a, the white color light radiated from the light source device 4 is dispersed into RGB and guided to the image forming unit 11. The image forming unit 11 then modulates an intensity of the light radiated from the light source device 4 to form an image. The image formed by the image forming unit 11 is expanded and projected on the screen 2 by the projection mechanism 3b. While the image forming unit 11 is formed by the DMD element in the embodiment, the configuration is not limited thereto and the image forming unit 11 may be formed by a liquid crystal light valve, for example. In essence, it is only necessary for the image forming unit 11 to include a function of modulating the intensity of the light radiated from the light source device 4 to form an image, and the kind of the image forming unit 11 may be changed arbitrarily.

At an upper side in the vertical direction, i.e., a near side, of the image forming unit 11 illustrated in FIG. 3, provided is an OFF-light plate that receives unnecessary light which is not used as the projection light in the incoming light to the image forming unit 11. When light comes in, the image forming unit 11 operates the plurality of micromirrors in time division manner depending on a function of the DMD element based on picture data, reflects by the micromirrors light to use to the projection lens 10, and reflects light to discard to the OFF-light plate. The image forming unit 11 reflects the light that is to be used for the projection image to the projection mechanism 3b. The light reflected to the projection mechanism 3b is expanded through a plurality of projection lenses 10 and projected as picture light.

Figure 5:
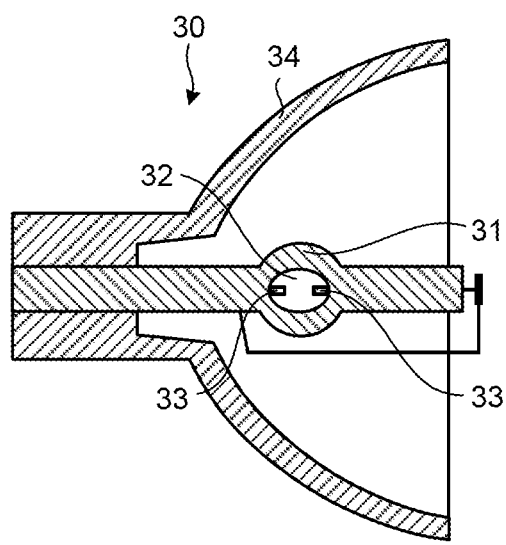
FIG. 5 is a cross sectional view of a high pressure mercury lamp according to the embodiment.

Next, a high pressure mercury lamp 30 to be used as a light source of the light source device 4 will be explained. FIG. 5 is a cross sectional view of a high pressure mercury lamp 30 that the light source device 4 uses as a light source.

The high pressure mercury lamp 30 illustrated in FIG. 5 is provided with a tube portion 31, a mercury 32 that is included in an inside of the tube portion 31 under high pressure and serves as a light emitting material, a pair of electrodes 33 provided in the inside of the tube portion 31, and a reflector 34. The mercury 32 emits light due to an electric discharge between the electrodes 33, so that the high pressure mercury lamp 30 functions as a light source.

More specific explanation will be made below. The pair of electrodes 33 is formed of tungsten, for example. When a high voltage is applied between the electrodes 33, an arc discharge is formed, a bright line spectrum and a continuous spectrum occur due to a mutual action with the mercury 32 included in the inside of the tube portion 31 under high pressure, and light is produced. The light radiated from the tube portion 31 is reflected by the reflector 34 and condensed at a given point. In the inside of the tube portion 31, starter noble gas and other halogen are included other than the mercury 32. When the mercury bridge in which the pair of electrodes 33 becomes connected (shunted) by the liquefied mercury 32 occurs, voltage cannot be applied between the electrodes 33 and the arc discharge is not formed, resulting in failure in lighting. When a distance between the electrodes 33 becomes short, the mercury 32 tends to link the electrodes 33, thereby increasing the probability of the occurrence of the mercury bridge. Since the lamp voltage depends on the distance between the electrodes 33, the lamp voltage becomes lower as the distance between the electrodes 33 becomes shorter.

Here, the distance between the electrodes 33 generally becomes long and short repetitively depending on the halogen cycle effect during the lighting of the high pressure mercury lamp 30. Moreover, the distance between the electrodes 33 is the shortest at the beginning stage of the life of the high pressure mercury lamp 30 and becomes longer little by little as time passes along the life of the high pressure mercury lamp 30 in the long term. Hence, the mercury bridge tends to occur most at the beginning stage of the life of the high pressure mercury lamp 30. Therefore, it is necessary to deal with the mercury bridge at the beginning stage of the life of the high pressure mercury lamp 30.

Figure 6:
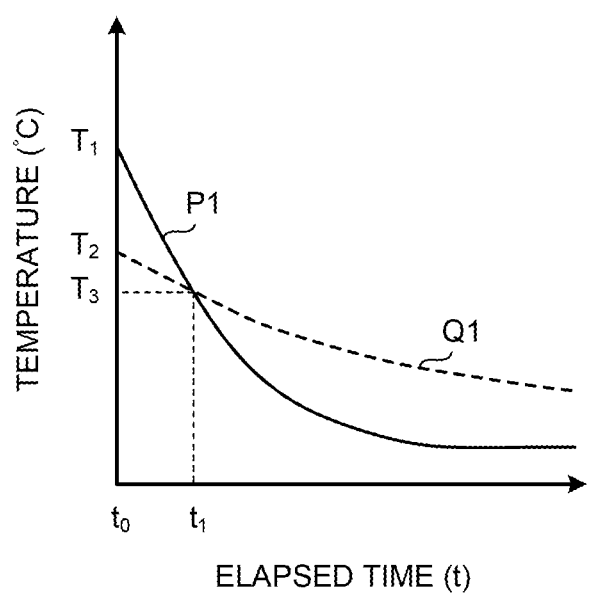
FIG. 6 illustrates an example of a temporal change in temperature in each of electrode and tube portion of a conventional projector.

Here, assumed is a conventional projector in which the high pressure mercury lamp 30 explained above is used as a light source. FIG. 6 illustrates an example of a temporal change in temperature in each of the electrodes 33 and the tube portion 31 when the after-cooling operation is not performed after the power source of the projector is turned off (after the power supply to the projector is stopped). In FIG. 6, the horizontal axis indicates an elapsed time (t) and the vertical axis indicates a temperature (° C.). In FIG. 6, a curved line P1 indicates a temporal change in temperature of the electrodes 33 and a curved line Q1 indicates a temporal change in temperature of the tube portion 31.

As illustrated in FIG. 6, a temperature $T_1$ of the electrodes 33 is remarkably higher than a temperature $T_2$ of the tube portion 31 at a time (time point $t_0$) after the power source of the projector is turned off. However, since a specific heat of the electrodes 33 is lower than that of the tube portion 31, the electrodes 33 tend to decrease in temperature compared to the tube portion 31. So, the electrodes 33 reach the same temperature $T_3$ as the tube portion 31 at a time point $t_1$. After the time point $t_1$, the temperature of the electrodes 33 falls below the temperature of the tube portion 31 and the difference in temperature therebetween becomes larger as time goes on. When the mercury 32 starts to return to liquid after the time point $t_1$, the mercury 32 tends to adhere to the electrodes 33 and the probability of the occurrence of the mercury bridge increases since the temperature of the electrodes 33 is lower than that of the tube portion 31.

Figure 7:
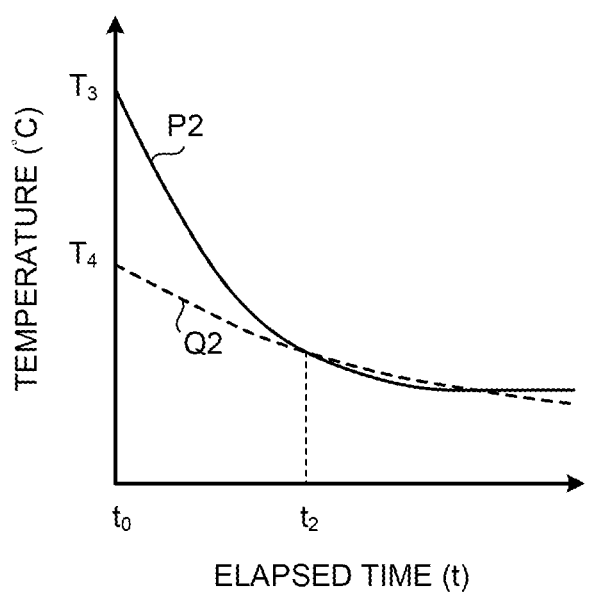
FIG. 7 illustrates another example of a temporal change in temperature in each of electrode and tube portion of the conventional projector.

FIG. 7 illustrates an example of a temporal change in temperature in each of the electrodes 33 and the tube portion 31 when the after-cooling operation is performed after the power source of the projector is turned off. In FIG. 7, the horizontal axis indicates an elapsed time (t) and the vertical axis indicates a temperature (° C.). In FIG. 7, a curved line P2 indicates a temporal change in temperature of the electrodes 33 and a curved line Q2 indicates a temporal change in temperature of the tube portion 31.

As illustrated in FIG. 7, a temperature $T_4$ of the tube portion 31 rapidly falls when the after-cooling operation is performed after the power source of the projector is turned off compared to the case in FIG. 6 where the after-cooling operation is not performed. In contrast, since not being affected by the after-cooling operation as much as the temperature of the tube portion 31 is affected, the temperature of the electrodes 33 hardly change in rapidity of the decrease in temperature compared to the case in FIG. 6 where the after-cooling operation is not performed. Therefore, a time point $t_2$ at which the electrodes 33 and the tube portion 31 inverts in temperature becomes later than the time point $t_1$ in FIG. 6 and a time period in which the temperature of the electrodes 33 is lower than that of the tube portion 31 becomes short. In other words, it is possible by performing the after-cooling operation after the power source of the projector is turned off to reduce the probability of the occurrence of the mercury bridge.

When receiving an input of an instruction signal for turning off the power source of the projector 1 in the embodiment, a voltage value of the high pressure mercury lamp during the lighting of the high pressure mercury lamp 30 is detected and the after-cooling operation in which the high pressure mercury lamp 30 is cooled is performed for a predetermined period of time. In other words, since the distance between the electrodes 33 has a correlation with the voltage (lamp voltage) between the electrodes 33 of the high pressure mercury lamp 30, the distance between the electrodes 33 is indirectly estimated by detecting the lamp voltage. To prevent the mercury bridge when the distance between the electrodes 33 is short in the embodiment, the after-cooling operation by a cooling fan is performed after the high pressure mercury lamp 30 is turned off. Hence, it is possible to shorten the time required until the high pressure mercury lamp 30 is turned off and to prevent the mercury bridge.

Figure 8:
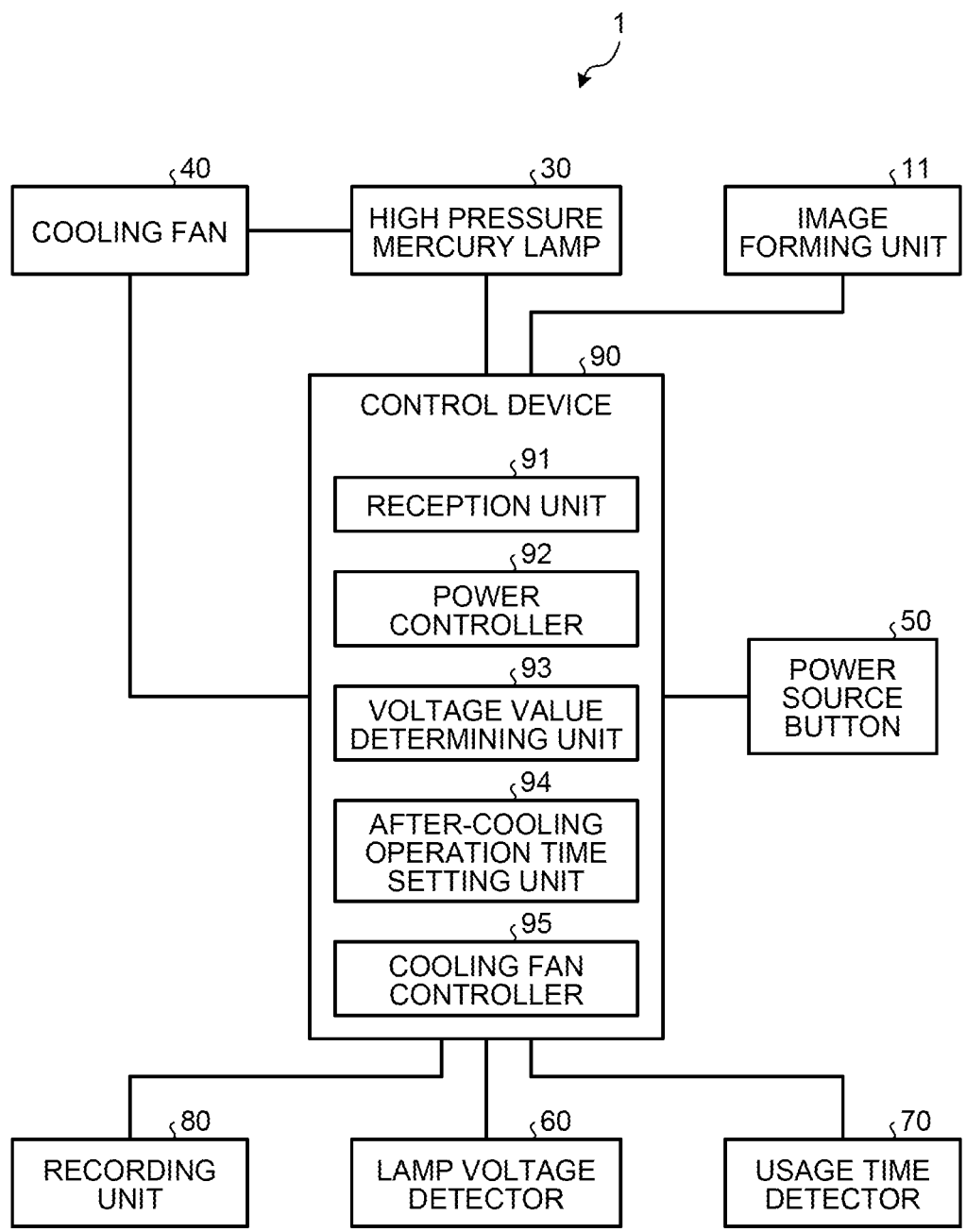
FIG. 8 is a block diagram of an example of a hardware configuration of the projector according to the embodiment.

FIG. 8 is a block diagram of an example of a bare minimum hardware configuration, required for realizing the present invention, of the projector 1. As illustrated in FIG. 8, the projector 1 is provided with the image forming unit 11, the high pressure mercury lamp 30, a cooling fan 40, a power source button 50, a lamp voltage detector 60, a usage time detector 70, a recording unit 80, and a control device 90.

The image forming unit 11 modulates an intensity of the light radiated from the high pressure mercury lamp 30 (the light source device 4) to form an image as explained above. The image formed by the image forming unit 11 is expanded and projected on the screen 2 (not illustrated) by the projection mechanism 3b (not illustrated in FIG. 8).

The high pressure mercury lamp 30 is a light source in which an electric discharge between the electrodes 33 causes the mercury 32 to emit light as explained above.

The cooling fan 40 is a fan that cools the high pressure mercury lamp 30 and driven under a control of the control device 90.

The power source button 50 is an operation device that instructs whether or not to supply power to the projector 1. The power source button 50 receives an input of an instruction signal for stopping the power supply to the projector 1 through an external depression. In the embodiment, the power source button 50 serves as an input unit.

The lamp voltage detector 60 detects a voltage value of the high pressure mercury lamp in the lighting of the high pressure mercury lamp 30 and outputs a result of the detection to the control device 90.

The usage time detector 70 detects a usage time of the high pressure mercury lamp 30 and outputs a result of the detection to the control device 90. Specifically, the usage time detector 70 detects a usage time from the start of using the high pressure mercury lamp 30.

The recording unit 80 records setting information of the lamp power for driving the high pressure mercury lamp 30 and a time of the after-cooling operation by the cooling fan 40, the time of the after-cooling operation being set based on the lamp power and the voltage value detected by the lamp voltage detector 60. In addition, the recording unit 80 records programs of various kinds, tables, and the like for driving the projector 1. Here, the setting information of the lamp power indicates a correspondence relation between a maximum value of the lamp power and a step width of the power. The step width is a setting value by which whether to make a reduction from the maximum value of the lamp power is specified for each of a plurality of power modes provided in the projector 1.

The control device 90 totally controls an entire operation of the projector 1. The control device 90 is provide with a reception unit 91, a power controller 92, a voltage value determining unit 93, an after-cooling operation time setting unit 94, and a cooling fan controller 95.

The reception unit 91 receives an instruction signal input from the power source button 50.

The power controller 92 controls power supply to the projector 1 depending on the instruction signal input form the power source button 50. For example, the power controller 92 performs a control of stopping the power supply to the projector 1 when an instruction signal for turning off the power is input from the power source button 50 via the reception unit 91.

The voltage value determining unit 93 determines whether or not the voltage value detected by the lamp voltage detector 60 is less than a preset threshold value when the instruction signal for turning off the power source of the projector 1 is input from the power source button 50. Here, the threshold value is set depending on the distance between the electrodes 33 of the high pressure mercury lamp 30 and the probability of the occurrence of the mercury bridge.

When the instruction signal for turning off the power source of the projector 1 is input from the power source button 50, the after-cooling operation time setting unit 94 sets an after-cooling operation time based on the setting value of the lamp power recorded in the recording unit 80 and the voltage value detected by the lamp voltage detector 60.

The cooling fan controller 95 controls the driving of the cooling fan 40. Specifically, the cooling fan controller 95 drives the cooling fan 40 to perform the after-cooling operation when the reception unit 91 receives the instruction signal for turning off the power source of the projector 1 from the power source button 50. The cooling fan controller 95 drives the cooling fan 40 to perform the after-cooling operation when the voltage value determining unit 93 determines that the voltage value is less than the threshold value.

While the control device 90 is formed by a computer device provided with a CPU, a ROM, a RAM, and the like, and respective functions of the reception unit 91, the power controller 92, the voltage value determining unit 93, and the cooling fan controller 95 are realized when the CPU executes programs stored in the ROM and the like in the embodiment, the configuration is not limited thereto. For example, at least a part of the respective functions of the reception unit 91, the power controller 92, the voltage value determining unit 93, the after-cooling operation time setting unit 94, and the cooling fan controller 95 may be realized by a specific hardware circuit.

The programs to be executed by the control device 90 may be provided by being stored in a file of an installable format or of an executable format in a computer-readable storage medium such as a CD-ROM, a flexible disk (FD), a CD-R, and a digital versatile disk (DVD). Moreover, the programs to be executed by the control device 90 may be stored on a computer connected to a network such as the Internet and provided by being downloaded via the network. In addition, the programs to be executed by the control device 90 may be provided or distributed via a network such as the Internet.

Figure 9:
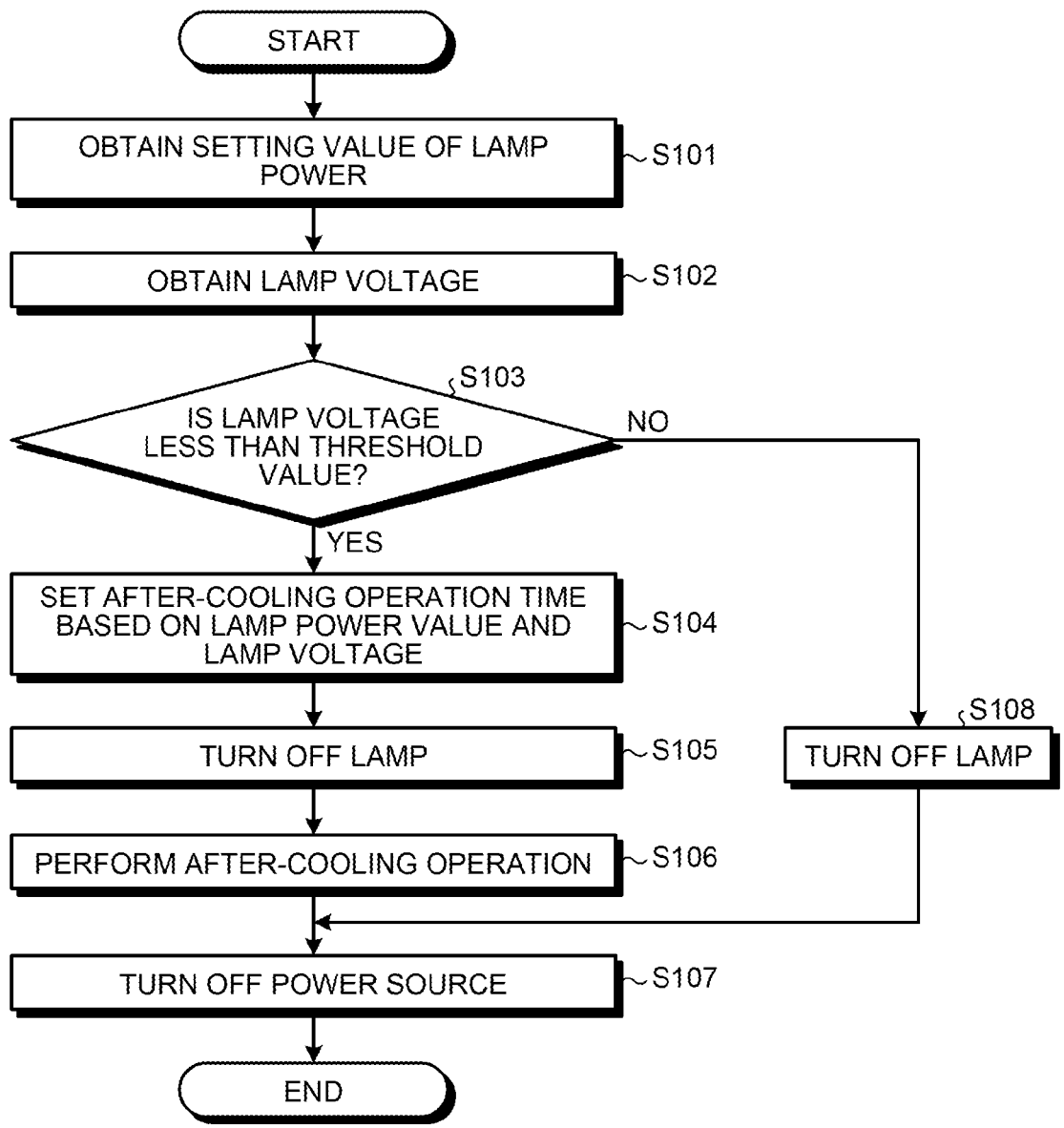
FIG. 9 is a flowchart of an operation example in turning off the power source of the projector according to the embodiment.

Next, an operation example of the projector 1 in turning off the power source will be explained with reference to FIG. 9. FIG. 9 is a flowchart of an operation example in turning off the power source of the projector 1.

As illustrated in FIG. 9, a user first depresses the power source button 50. The cooling fan controller 95 then obtains from the recording unit 80 a setting value of the lamp power set when the power source button 50 is depressed (step S101). The cooling fan controller 95 obtains the lamp voltage, detected by the lamp voltage detector 60, of the high pressure mercury lamp 30 in lighting (step S102).

Next, the voltage value determining unit 93 determines whether or not the lamp voltage detected by the lamp voltage detector 60 is less than the threshold value (step S103). When the voltage value determining unit 93 determines that the lamp voltage detected by the lamp voltage detector 60 is less than the threshold value (Yes at step S103), the projector 1 moves to step S104 which will be explained later. On the other hand, when the voltage value determining unit 93 determines that the lamp voltage detected by the lamp voltage detector 60 is not less than the threshold value (No at step S103), the projector 1 moves to step S108 which will be explained later.

At step S104, the after-cooling operation time setting unit 94 sets the after-cooling operation time for the high pressure mercury lamp 30 from a table of the after-cooling operation recorded in the recording unit 80 based on the lamp power value obtained from the recording unit 80 and the voltage value obtained from the lamp voltage detector 60.

The power controller 92 then stops the power supply to the high pressure mercury lamp 30 to turn off the high pressure mercury lamp 30 (step S105).

The cooling fan controller 95 then drives the cooling fan 40 in accordance with the after-cooling operation time obtained from the recording unit 80 to execute the after-cooling operation with respect to the high pressure mercury lamp 30 (step S106). It is thus possible to lower the temperature of the tube portion 31 rapidly and prevent the mercury bridge even when the distance between the electrodes 33 of the high pressure mercury lamp 30 becomes short with high probability of causing the mercury bridge.

After the after-cooling operation, the power controller 92 stops the power supply to respective units of the projector 1 to turn off the power of the projector 1 (step S107). After step S107, the projector 1 ends the processing.

At step S108, the power controller 92 stops the power supply to the high pressure mercury lamp 30 to turn off the high pressure mercury lamp 30. After step S108, the projector 1 moves to step S107.

According to the embodiment explained above, when the voltage value determining unit 93 determines that the voltage is less than the threshold value, the cooling fan controller 95 drives the cooling fan 40 to perform the after-cooling operation. As a result of this, it is possible to shorten the time required until the lamp is turned off and to prevent the mercury bridge.

In the embodiment, the cooling fan controller 95 may increase the number of rotations of the cooling fan 40 in the after-cooling operation, compared with that in the lighting of the high pressure mercury lamp 30. It is thus possible to shorten the after-cooling operation time.

In the embodiment, the lamp voltage of the high pressure mercury lamp 30 becomes high at the last stage of the life and the probability of the occurrence of the mercury bridge becomes low. Therefore, the cooling fan controller 95 may not perform the after-cooling operation when the usage time detected by the usage time detector 70 exceeds a predetermined time, for example, a time corresponding to the last stage of the life. It is thus possible to prevent a malfunction in a false detection of the lamp voltage value by the lamp voltage detector 60.

In the embodiment, there arises a variation in correlation between the lamp voltage and the distance between the electrodes 33 due to piece-to-piece variations of the high pressure mercury lamp 30. Therefore, the after-cooling operation time setting unit 94 may set the after-cooling operation time based on the voltage value detected by the lamp voltage detector 60 in starting to use the projector 1 and the voltage value detected by the lamp voltage detector 60 in turning off the high pressure mercury lamp 30. In this case, the cooling fan controller 95 performs the after-cooling operation in accordance with the time set by the after-cooling operation time setting unit 94. It is thus possible to suppress a malfunction since a variation from the beginning can be used as a parameter.

According to the embodiment, it is possible to shorten a time required until the lamp is turned off and to prevent mercury bridge.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
   a light source in which a light emitting material emits light through an electric discharge between electrodes;
   an image forming unit to modulate an intensity of the light emitted from the light source to form an image;
   a cooling fan to cool the light source;
   an input unit to receive an input of an instruction signal for turning off a power source of the image projection apparatus;
   a voltage detector to detect a voltage value of the light source in lighting;
   a voltage value determining unit to determine whether the voltage value detected by the voltage detector is less than a threshold value when the input unit receives the instruction signal; and
   a cooling fan controller to perform an operation of driving the cooling fan to cool the light source upon the voltage value determining unit determining that the voltage value is less than the threshold value.

2. The image projection apparatus according to claim 1, wherein the cooling fan controller is configured to increase a number of rotations of the cooling fan in the operation, compared with a number of rotations of the cooling fan in the lighting of the light source.

3. The image projection apparatus according to claim 1, further comprising:
   a usage time detector to detect a usage time of the light source, wherein
   the cooling fan controller is configured to not perform the operation when the usage time detected by the usage time detector exceeds a determined time period.

4. The image projection apparatus according to claim 1, further comprising:
   an operation time setting unit to set a period of time during which the operation is performed based on the voltage value detected by the voltage detector in starting to use the image projection apparatus and the voltage value detected by the voltage detector in turning off the light source, wherein
   the cooling fan controller is configured to perform the operation in accordance with the period of time set by the operation time setting unit.

5. A control method to be performed in an image projection apparatus including a light source in which a light emitting material emits light through an electric discharge between electrodes; an image forming unit to modulate an intensity of the light emitted from the light source to form an image; and a cooling fan to cool the light source, the control method comprising:
   receiving an input of an instruction signal for turning off a power source of the image projection apparatus;
   detecting a voltage value of the light source in lighting;
   determining whether the detected voltage value is less than a threshold value when the instruction signal is received; and
   performing an operation of driving the cooling fan to cool the light source upon determining that the voltage value is less than the threshold value.

6. The control method of claim 5, wherein a number of rotations of the cooling fan are increased in the operation, compared with a number of rotations of the cooling fan in the lighting of the light source.

7. The control method of claim 5, further comprising:
   detecting a usage time of the light source, wherein the operation is not performed when the detected usage time exceeds a determined time period.

8. The control method of claim 5, further comprising:
   setting a period of time during which the operation is performed based on the voltage value detected in starting to use the image projection apparatus and the voltage value detected in turning off the light source, wherein the operation is performed in accordance with the period of time set.

9. A non-transitory computer-readable storage medium with an executable program stored thereon and executed by a computer of an image projection apparatus including a light source in which a light emitting material emits light through an electric discharge between electrodes, an image forming unit to modulate an intensity of the light emitted from the light source to form an image, and a cooling fan to cool the light source, wherein the program instructs the computer of the image projection apparatus, when executed, to perform:
   receiving an input of an instruction signal for turning off a power source of the image projection apparatus;
   detecting a voltage value of the light source in lighting;
   determining whether the detected voltage value is less than a threshold value when the instruction signal is received; and
   performing an operation of driving the cooling fan to cool the light source upon determining that the voltage value is less than the threshold value.

10. The non-transitory computer-readable storage medium of claim 9, wherein, a number of rotations of the cooling fan are increased in the operation, compared with a number of rotations of the cooling fan in the lighting of the light source.

11. The non-transitory computer-readable storage medium claim 9, wherein the program instructs the computer of the image projection apparatus to further perform:
   detecting a usage time of the light source, wherein the operation is not performed when the detected usage time exceeds a determined time period.

12. The non-transitory computer-readable storage medium claim 9, wherein the program instructs the computer of the image projection apparatus to further perform:
   setting a period of time during which the operation is performed based on the voltage value detected in starting to use the image projection apparatus and the voltage value detected in turning off the light source, wherein the operation is performed in accordance with the period of time set.

* * * * *